(12) United States Patent  (10) Patent No.: US 7,494,161 B2
Kanai et al.  (45) Date of Patent: Feb. 24, 2009

(54) COMING OFF PREVENTING DEVICE OF A JOINT OF AN AIR SUPPLY AND EXHAUST PIPE

(75) Inventors: Ichiyo Kanai, Gunma-ken (JP); Takao Hatakeyama, Gunma-ken (JP)

(73) Assignee: Japan Pipe System Co., Ltd., Oura-Gun, Gunma-Ken (JP)

( * ) Notice: Subject to any disclaimer, the term of this patent is extended or adjusted under 35 U.S.C. 154(b) by 299 days.

(21) Appl. No.: 11/286,815

(22) Filed: Nov. 23, 2005

(65) Prior Publication Data

US 2007/0114793 A1  May 24, 2007

(51) Int. Cl.
*F16L 21/00*  (2006.01)
(52) U.S. Cl. ............................. 285/403; 285/7; 285/303; 285/317
(58) Field of Classification Search .................... 285/7, 285/302–303, 317, 403
See application file for complete search history.

(56) References Cited

U.S. PATENT DOCUMENTS

| | | | |
|---|---|---|---|
| 2,254,611 A * | 9/1941 | Lofgren | 285/7 |
| 4,641,859 A * | 2/1987 | Walters | 285/27 |
| 6,341,804 B1 | 1/2002 | Ito et al. | |
| 6,832,784 B1 * | 12/2004 | Chen | 285/7 |

FOREIGN PATENT DOCUMENTS

JP  H10-253038  9/1998
JP  2000-146066  5/2000
JP  2000-304182  11/2000

* cited by examiner

*Primary Examiner*—Aaron M Dunwoody
*Assistant Examiner*—Fannie Kee
(74) *Attorney, Agent, or Firm*—Flynn, Thiel, Boutell & Tanis, P.C.

(57) ABSTRACT

A coming off preventing device is provided for a joining part of an air supply and exhaust pipe which joins two pipes by inserting an entry of one air supply and exhaust pipe into a socket of another air supply and exhaust pipe. A cut out window is provided at the socket side, and a metal stopper is equipped on the outer side of the cut out window, wherein the metal stopper has a lock unit which includes a push part on an upper surface of one end, a rectangular shaped lock part on a lower surface of another end and a bearing part on an upper surface of a center part. Further, the lock unit has a lower surface to which one end of a plate spring is welded wherein the plate spring is bent to have an obtuse angle. A joint cover covers said lock unit and fixes said lock unit axially. Further to the entry side, a circumferential groove is engraved to the opposite direction to the entry with a gradient, and an entry stopper. The groove stops coming off by fitting of or receiving the rectangular shaped lock part of said lock unit. By only inserting an entry of one pipe into a socket of the other pipe, the lock unit is fixed into the circumferential groove and a coming off preventing function is generated. Further, an air supply and exhaust pipe can be easily pulled off from another air supply and exhaust pipe by pushing a push part with a finger.

13 Claims, 6 Drawing Sheets

COMING OFF PREVENTING DEVICE OF A JOINT OF AN AIR SUPPLY AND EXHAUST PIPE

FIELD OF THE INVENTION

The present invention relates to a coming off preventing device of a joining part which joins one air supply and exhaust pipe by inserting an entry of another air supply and exhaust pipe into a socket of the one air supply and exhaust pipe. In more detail, the present invention relates to a coming off or removal preventing device of a joining part of an air supply and exhaust pipe which has a coming off preventing effect when engaged by inserting the entry of the other pipe to the socket of the one pipe and which allows the other pipe to be pulled out at a touch.

DESCRIPTION OF THE PRIOR ART

Piping of an air supply and exhaust pipe of a combustion apparatus is carried out by joining air supply and exhaust pipes by inserting an entry of one air supply and exhaust pipe to a socket of another air supply and exhaust pipe. On the piping, a coming off preventing device is equipped to each air supply and exhaust pipe so as to prevent coming off of the entry of the one pipe from the socket of the other pipe at the joining part between the one and the other pipes. Conventionally, these kinds of coming off preventing devices use an apparatus having a structural feature characterized by an elastic pawl plate that is equipped or provided on an inner surface of a socket facing toward an inner direction, wherein said elastic pawl plate fits in a circumferential groove engraved in an entry when the entry is inserted into the prescribed position of the socket (JPH10-253038 Publication, JP2000-146066 Publication). This coming off preventing device has a problem in that stable strength against a pulling out force can not be obtained, and further has a problem of requiring complicated handling for pulling out or disengagement, because, at the pulling out of an inner pipe from an outer pipe, it is necessary to rotate the inner pipe or the outer pipe so that the elastic pawl plate can meet or align with a pull out groove engraved beside the circumferential groove.

Therefore, a device which serves a coming off preventing function acts only by inserting an entry of one pipe to a socket of another pipe wherein it is not possible to pull out the one pipe after insertion. When it becomes necessary to pull the one pipe of the other pipe off, a device is proposed which makes it possible to pull off at a touch without rotating an air supply and exhaust pipe. For example, a coming off preventing device mentioned below is proposed in the JP2000-304182 Publication. Namely, a cut out window is provided at a socket, a cover is formed with a flank space, a lock wall and a slide guide part are provided wherein the cover is equipped at the outer side of the cut out window, and lock parts are provided comprising a lock part on one end and a stopper manipulation part on another end. The lock part is contained in the cover by maintaining a center part thereof with said slide guide part, while, to the entry side, a circumferential groove is provided which stops coming off by fitting the lock part of said lock parts in the circumferential groove when the socket is inserted to the prescribed position.

The object of the present invention is to provide a joining apparatus that defines a coming off or separation preventing function that acts only by inserting an entry to a socket and maintains stable strength against a pulling out force when inserted, and further when it becomes necessary to pull off or separate one pipe from the other, the apparatus makes it possible to pull off or separate one pipe from the other at a touch.

The present invention is a coming off or separation preventing device for a joining part of an air supply and exhaust pipe which joins air supply and exhaust pipes. Joining is accomplished by inserting an entry of one air supply and exhaust pipe into a socket of another air supply and exhaust pipe. The device comprises a cut out window provided at said socket side, and a metal stopper (stopper fittings) equipped at the outer side of the cut out window. Said metal stopper comprises a lock unit which includes a push part on an upper surface of one end, a rectangular shaped lock part on a lower surface of another end and a bearing on an upper surface of a center part. Further, the lower surface of the lock unit has one end of a plate spring welded thereto, which plate spring is bent to have an obtuse angle. A joint cover is provided which covers said lock unit and fixes said lock unit axially relative to said joint cover. Further, to the entry side, a circumferential groove is provided which stops coming off by fitting or receiving the rectangular shaped lock part of said lock unit. The groove is engraved to the opposite direction of the entry wherein the entry has a gradient at the terminal end and an entry stopper spaced axially of the terminal end. It is desirable that said rectangular shaped lock part is of square shape. Further, it is desirable to equip an O ring behind said metal stopper.

The coming off preventing device for the joining part of an air supply and exhaust pipe of the present invention is characterized in that the coming off preventing function acts only by inserting an entry of an inner pipe to a socket of an outer end, and therefore, the preventing function that prevents pull out displays stable strength after the inner pipe is inserted. Further, when it becomes necessary to pull out the jointed pipe, this device is excellent in providing easy handling since it is possible to pull out the inner pipe at a touch.

DESCRIPTION OF THE PREFERRED EMBODIMENT

Figure 1:
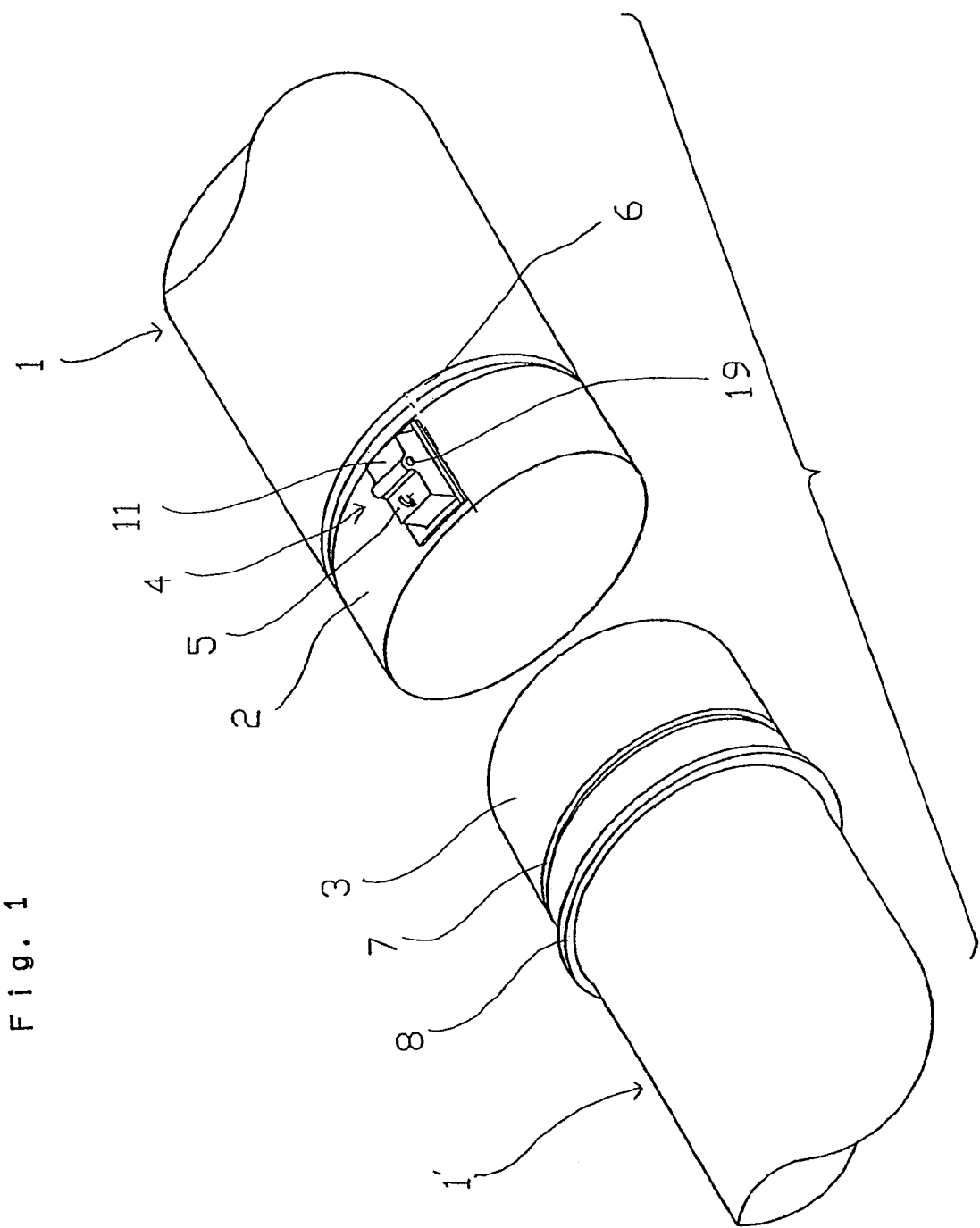
FIG. 1 is a perspective view of the coming off preventing device of the present invention for a joining part of an air supply and exhaust pipe.

An example of the present invention will be illustrated according to the drawings. In general, an air supply and exhaust pipe has a certain length, and a socket is provided on one end and an entry is provided on another end. In the case of laying a pipe using said air supply and exhaust pipe, pipes are joined by inserting an entry of one pipe to a socket of the other air supply and exhaust pipe. FIG. 1 is a perspective view illustrating a joining process of the air supply and exhaust pipe which engages the coming off or separation preventing device of a joining part of the present invention. 1 and 1' are air supply and exhaust pipes, and 2 is a socket provided on the socket end of the air supply and exhaust pipe 1. 3 is an entry provided on the insert end of the other air supply and exhaust pipe 1'. 4 is a metal stopper. The metal stopper 4 is equipped on the outer side of a cut out window provided in the socket 2. 5 is a push part. 6 is an O ring container provided to the part of the metal stopper 4. Further, 7 is a circumferential groove engraved on the entry 3, and 8 is an entry stopper. 19 is a hole which fits therein a pin. By inserting an entry 3 of an air supply and exhaust pipe 1' to the socket 2 of the other air supply and exhaust pipe 1, the air supply and exhaust pipe 1 and the air supply and exhaust pipe 1' are jointed or joined together. The shape of the air supply and exhaust pipe 1, 1' can be a linear shape or a curved shape. Further, the present invention can be applied to a joining part of an air supply and exhaust pipe to which only a socket is provided and an air supply and exhaust pipe to which only an entry is provided.

Figure 2:
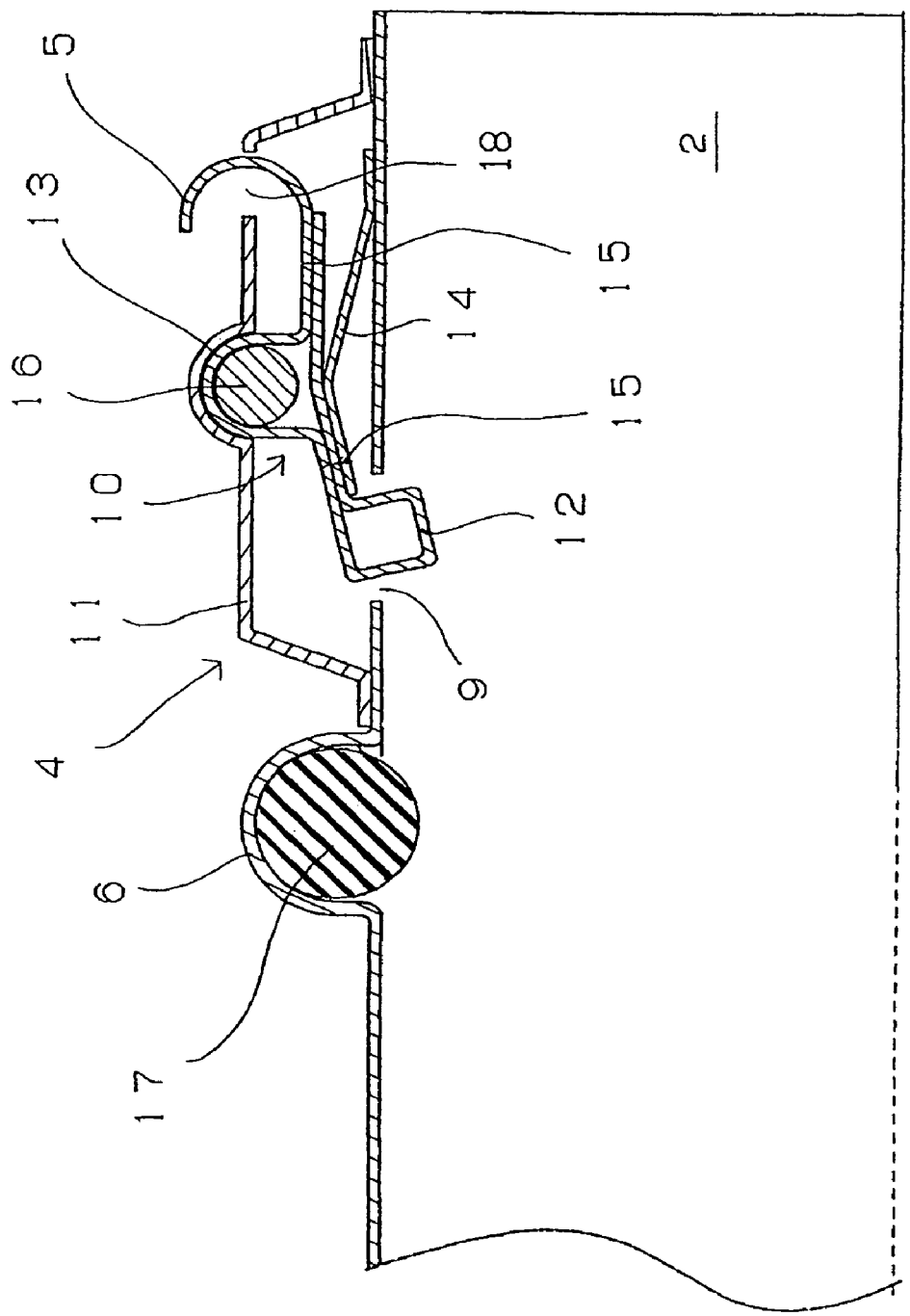
FIG. 2 is a cross sectional view of a socket side of a coming off preventing device of the joining part of an air supply and exhaust pipe of the present invention.
Figure 3:
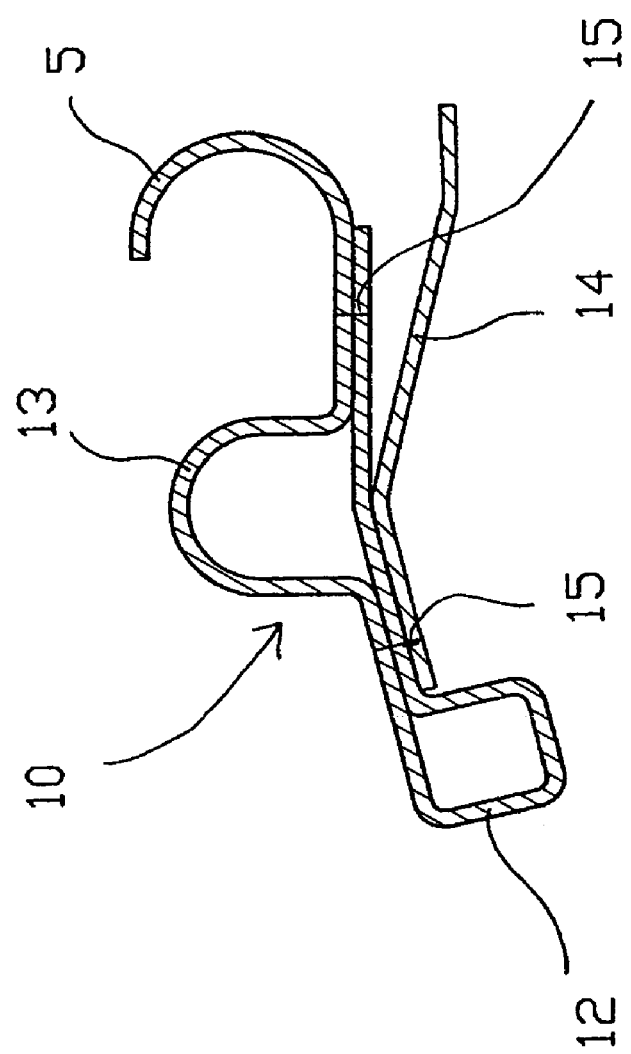
FIG. 3 is a cross sectional view of a lock unit of the device of the present invention.

FIG. 2 is a cross sectional view of the socket 2 of the air supply and exhaust pipe 1. 9 is a cut out window provided in the socket 2 of the air supply and exhaust pipe 1. A metal stopper 4 is composed of a lock unit 10 and a joint cover 11 which covers the lock unit 10. FIG. 3 is a cross sectional view of the lock unit 10. This lock unit 10 has a push part 5 on the upper surface of one end, a lock part 12 of rectangular shape on the lower surface of the other end, a bearing part 13 on the outer surface of the center part and a plate spring 14 which is bent to have obtuse angle and is welded on a lower surface side. In the lock unit 10, it is desirable that the lock unit 10 be formed as one long metal plate which is processed by bending and forms a push part 5, a bearing part 13 and a lock part 12. In the process, the push part 5 is processed to have a shape so as to be easily pushed by a finger. The bearing part 13 has a space in which a pin can be inserted so as to permit voluntary rotation. The lock part 12 is bent to form a rectangular shape. In this example, the lock part 12 forms a square shaped cross sectional view. Further, the plate spring 14 is composed of a long plate spring that is bent to have an obtuse angle. By bending to have such an obtuse angle, the spring function of the plate spring 14 can be effectively displayed. One end of the plate spring 14 is adhered by a suitable method such as, for example, by welding to the remainder of the lock unit 10. 15 is a spot welded part at one end of the plate spring 14. It is desirable to bend the other end of the plate spring to have an obtuse angle relative to the opposite direction which is spot welded.

In FIG. 2, a joint cover 11 covers the lock unit 10 and has enough space so that the lock part 12 of the lock unit 10 moves between upper and lower positions. Further, as to the joint cover 11, a cut out window 18 is provided from which the push part 5 of the lock unit 10 projects. Also as to the joint cover 11, the hole 19 (FIG. 1) is punched to allow fixing therein of a pin 16. Said pin 16 is thrust or inserted in the bearing part 13 of the lock parts 10 so as to rotate freely, and both ends of the pin 16 are fixed in holes 19 punched on the right side and left side of the joint cover 11. By said structural feature, the lock unit 10 is rotatably supported by pin 16 in a condition such that the free rotation is possible around the axis of pin 16. That is, the lock unit 10 is fixed to the joint cover 11. Further, in this example, one end of plate spring 14 is spot welded closely to the lock part 12 so as to be located on the lower surface between the lock part 12 of the lock unit 10 and the bearing part 13. Further, the one end of plate spring 14 alternatively can be spot welded to the lower surface between the push part 5 of the lock unit 10 and the bearing part 13 closely to the push part 5, as shown in FIG. 4.

Figure 4:
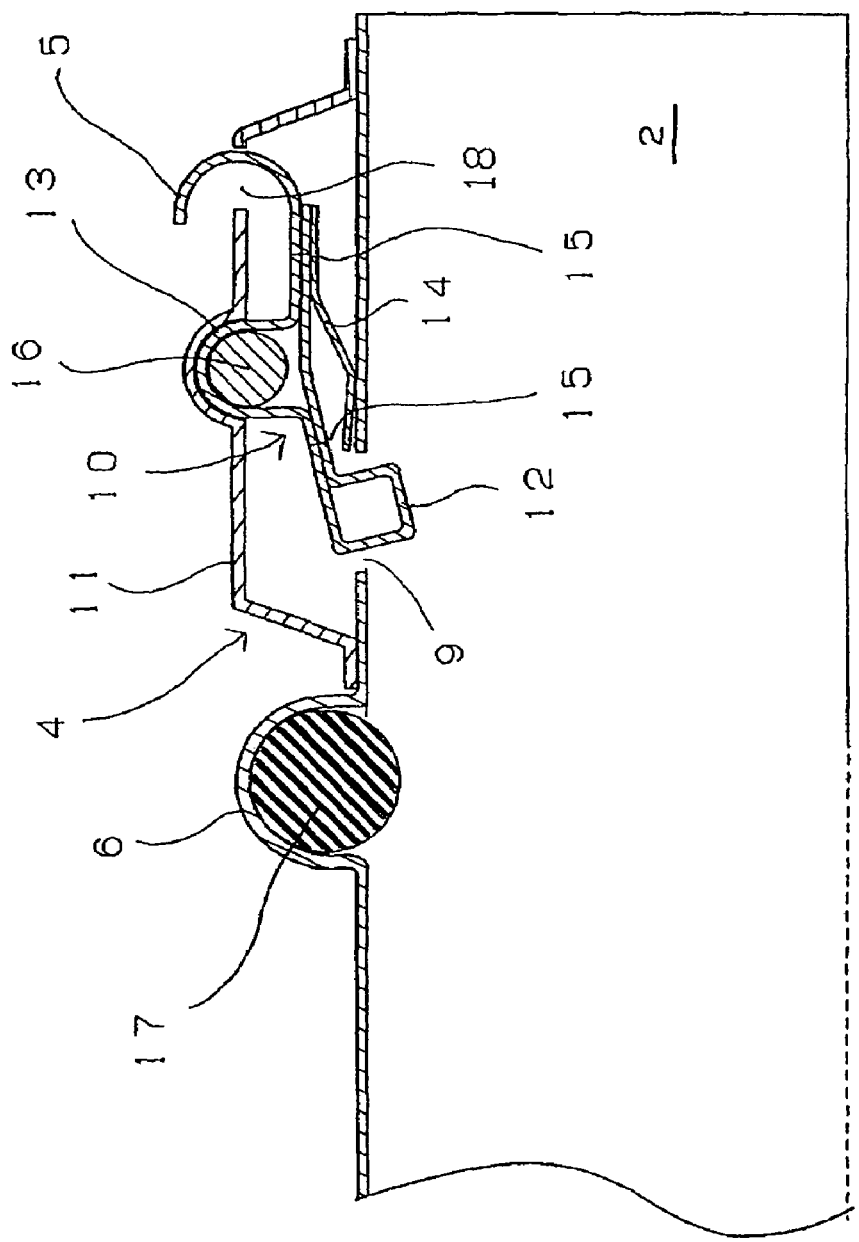
FIG. 4 is a cross sectional view of another example of the present invention showing a socket side of an air supply and exhaust pipe before joining.

The metal stopper 4 is equipped or provided in the condition such that when the lock part 12 of the lock unit 10 projects to the inner side from the cut out window 9 formed in the socket side of the air supply and exhaust pipe 1, the push part 5 projects from the cut out window 18 of the joint cover 11 and the end of plate spring 14 of the lock unit 10 (the free end which is not spot welded) contacts the outer surface of the air supply and exhaust pipe 1 (the state shown in FIG. 2 or FIG. 4). Equipping of the metal stopper 4 is carried out by fixing the outer peripheral part of the joint cover 11 in a prescribed position by spot welding. Further, it is desirable to provide an O ring 17 to seal the joining part, which O ring 17 is located closely behind the metal stopper 4. 17 is the O ring and 6 is a container for the O ring.

Figure 5:
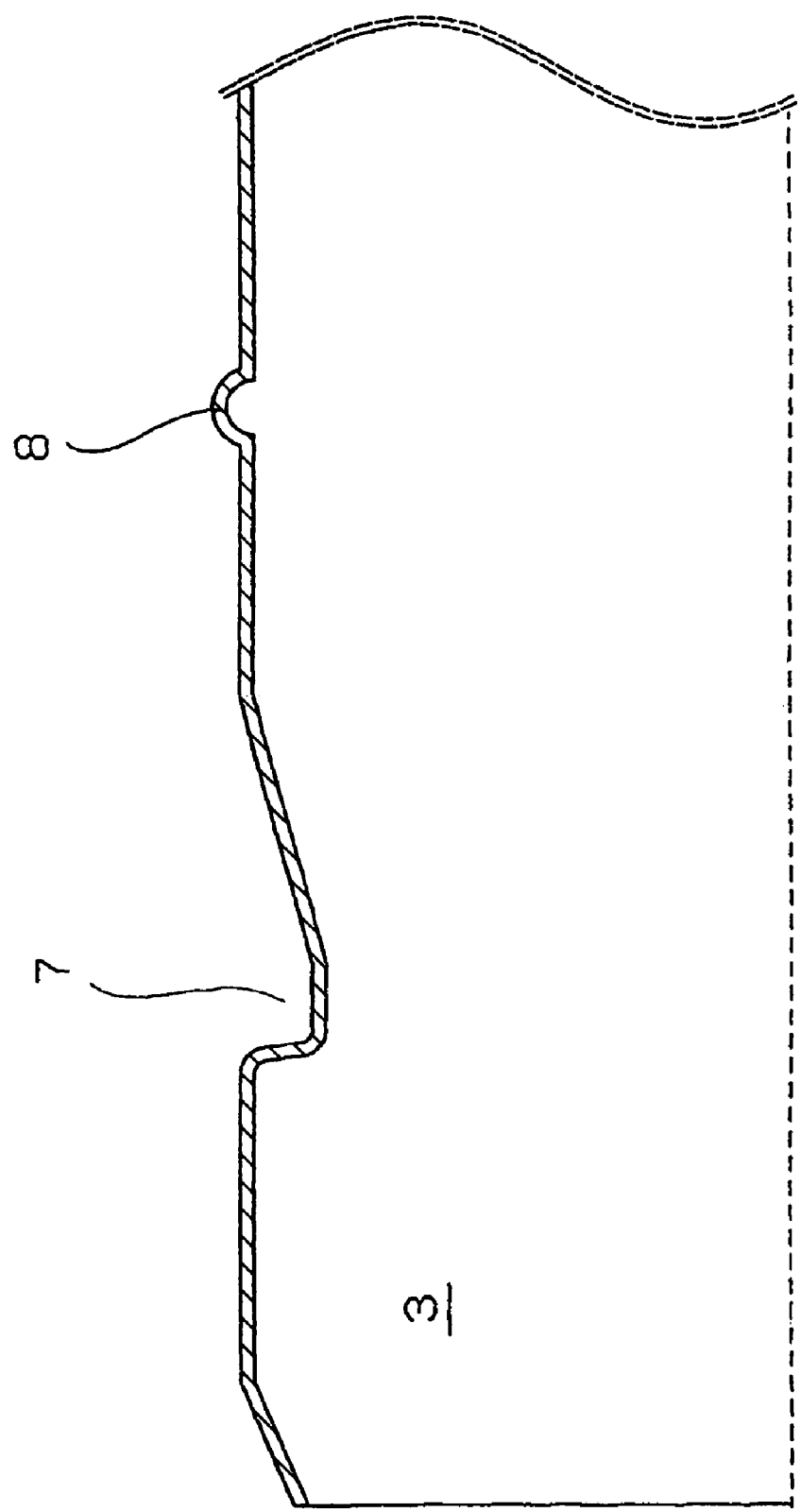
FIG. 5 is a cross sectional view of an entry of an air supply and exhaust pipe before joining of the present invention.

FIG. 5 is a cross sectional view of a socket 3 of an air supply and exhaust pipe 1'. 7 is a circumferential groove. This circumferential groove 7 has enough depth to fix therein or receive the lock part 12 of the lock unit 10 when connected. Further, said circumferential groove 7 is formed so as to have an inclination in the opposite direction of the socket 3 and a radially projecting stop surface on the side opposite the inclination. That is, the opposite side of the socket 3 of the circumferential groove 7 is inclined toward the outer dimension. By forming as above, a clearance is formed when the lock part 12 of lock unit 10 is fixed in the circumferential groove 7, such that fine adjustment of laying of pipe becomes easy which allows for coping with thermal expansion of an air supply and exhaust pipe. 8 is an entry stopper, which is formed as a convex part having an arc shape along the circumference of the air supply and exhaust pipe 1'. When an entry 3 of an air supply and exhaust pipe 1' is inserted into a socket 2 of an air supply and exhaust pipe 1, the end of the socket 2 contacts the convex part of the entry stopper 8 such that further inserting beyond the stop position becomes impossible. Further, by providing said stopper 8, it becomes possible to enhance the pipe strength of the socket 3 which protects the socket 3 from breaking.

Figure 6:
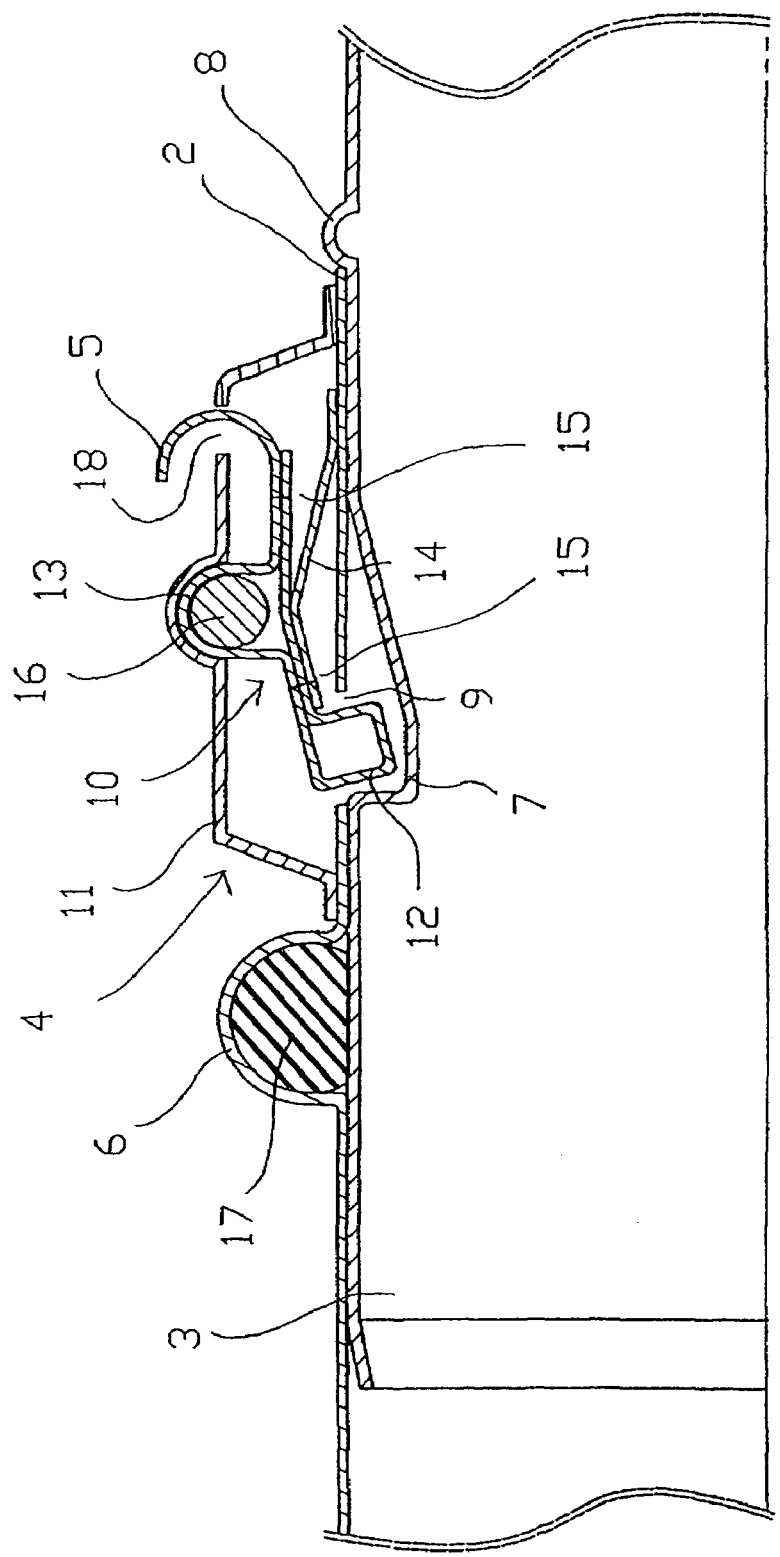
FIG. 6 is a cross sectional view of a joining part after joining of the present invention.

FIG. 6 is a cross sectional view illustrating the state where an air supply and exhaust pipe 1 and an air supply and exhaust pipe 1' are joined by inserting the entry 3 of the air supply and exhaust pipe 1' shown in FIG. 5 into a socket 2 of the air supply and exhaust pipe shown in FIG. 2. When the entry 3 of the air supply and exhaust pipe 1' is inserted into the socket 2 of the air supply and exhaust pipe 1, the rectangular lock part 12 of lock unit 10 is pushed up by the outer wall of the entry 3 of the air supply and exhaust pipe 1'. However, the stress or biasing force which pushes the lock part 12 down by action of the spring plate 14 is always loaded on the lock part 12. Consequently, when the insertion is continued further, the circumferential groove 7, which is provided on the entry 3 of the air supply and exhaust pipe 1', reaches the position of lock part 12 of the lock unit 10, wherein the lock part 12 is pushed down and fixed in the circumferential groove 7. An end of the entry 2 of the air supply and exhaust pipe 1 contacts the socket stopper 8. Accordingly, the joining of an air supply and exhaust pipe with another air supply and exhaust pipe can be carried out without coming off or separation of the air supply and exhaust pipe from another air supply and exhaust pipe and without excess insertion of the air supply and exhaust pipe.

In the case of pulling off the entry 3 from the socket 2 of an air supply and exhaust pipe 1, the push part 5 projecting from the metal stopper 4 is pushed down by a finger. By pushing down by a finger, the lock part 12 of the lock unit 10 is lifted around the axis of the pin 16 and comes off from or lifts out of the circumferential groove 7 of the entry 3. Accordingly, the entry 3 of the one air supply and exhaust pipe 1' can be easily pulled off from the socket 2 of the other air supply and exhaust pipe 1.

What is claim:

1. A coming off preventing device for a joining part of an air supply and exhaust pipe arrangement comprising first and second air supply and exhaust pipes being joined by inserting an entry end of an entry of said first air supply and exhaust pipe into a socket of said second air supply and exhaust pipe, and said coming off preventing device comprising a cut out window provided at a socket side of said second air supply and exhaust pipe, and a metal stopper provided at an outer side of the cut out window, said metal stopper having a lock unit comprising first and second ends, a center part, a push part on an upper surface of said first end, a rectangular shaped lock part on a lower surface of said second end, and a bearing part on an upper surface of said center part, said lower surface of said lock unit having one end of a plate spring welded thereto, said plate spring being bent to have an obtuse angle to bias said lock part into said cut out window, a joint cover being provided which covers said lock unit and rotatably supports said lock unit by said bearing part so as to fix said lock unit in an axial position relative to said joint cover and said second air supply and exhaust pipe, a circumferential groove being provided on an entry side of said first air supply and exhaust pipe which stops coming off by receiving the rectangular shaped lock part of said lock unit in said groove, said groove being formed in said entry in the opposite direction to the entry end and between said entry end and an entry stopper which cooperates with said socket to limit insertion of said entry into said socket.

2. The coming off preventing device of claim 1, wherein said rectangular shaped lock part has a square shape.

3. The coming off preventing device of claim 1 wherein said one end of said plate spring is welded to the lower surface of said lock unit between said lock part and said bearing part.

4. The coming off preventing device of claim 1 wherein said one end of said plate spring is welded to the lower surface of said lock unit between said push part and said bearing part.

5. The coming off preventing device according to claim 1 wherein an 0 ring is equipped behind said metal stopper.

6. The coming off preventing device of claim 1, wherein the plate spring connects to the lock unit to form an obtuse angle on the surface of the plate spring facing the outer side of said socket.

7. The coming off preventing device of claim 1, wherein said entry stopper is defined by an arcuate projection on the outer surface of said first air supply and exhaust pipe, said entry stopper contacting said socket when said entry end is inserted within said socket.

8. The coming off preventing device of claim 1, wherein said lock unit is rotatable by said push part to remove said lock part from said groove to permit removal of said first air supply and exhaust pipe from said second air supply and exhaust pipe.

9. The coming off preventing device of claim 8, wherein said lock unit is rotatably supported in an axially fixed position on said cover by a pivot pin rotatably supporting said bearing part.

10. A coming off preventing arrangement for a joining part of a first air supply and exhaust pipe and a second air supply and exhaust pipe, said coming off preventing arrangement comprising:

a socket defined on a first terminal pipe end of said first air supply and exhaust pipe which has a hollow interior, said socket including a cut out window which opens radially into said hollow interior;

an entry defined on a second terminal pipe end of said second air supply and exhaust pipe which is insertable axially into said hollow interior of said first terminal pipe end, said entry having a circumferential groove disposed on an outer surface thereof; and a stopper unit fixedly attached to the outer surface of said socket proximate said cut out window, said stopper unit comprising a cover fixed to said socket in an axially fixed position, and a lock unit rotatably supported on said cover in an axially fixed position, said lock unit comprising a push part accessible exteriorly of said joint cover, and a center part retained by said joint cover and rotatably supported thereon by a bearing, said lock unit further comprising a lock projection operatively connected to said push part and projecting inwardly through said window into said hollow interior of said socket, and a spring member which is resiliently deformable, said spring member operatively connected to said lock unit and the outer surface of said socket to bias said lock part radially inwardly into said window, said lock part being displaceable radially outwardly against said spring member so as to slide axially along said entry during axial insertion of said entry into said socket, and locking radially inwardly into said circumferential groove when said entry is inserted to a seated position in said socket in response to resilient biasing by said spring member, said lock unit being manually unlocked with respect to said circumferential groove, when said entry is disposed in said socket, in response to axial rotation of said lock unit about said bearing by manual radial pushing of said push part.

11. The coming off preventing device of claim 10, wherein the lock part is rectangular in cross-section and said groove has a radially projecting stop face which abuts against said lock part and prevents coming off in the absence of manual pushing of said push part which unlocks said lock part.

12. The coming off preventing device of claim 10, wherein one end of said spring member is fixed to the lock unit.

13. The coming off preventing device of claim 10, wherein one end of said spring member is fixed to the push part.

* * * * *